US006934458B2

(12) United States Patent
Brown et al.

(10) Patent No.: US 6,934,458 B2
(45) Date of Patent: Aug. 23, 2005

(54) METHOD AND APPARATUS FOR GENERATING A PULSE WIDTH MODULATED SIGNAL AND OPTICAL ATTENUATOR CONTROLLED BY A PULSE WIDTH MODULATED SIGNAL

(75) Inventors: Roger W Brown, Nottingham (GB); Earl A Dennis, Nottingham (GB); Darren W Vass, Nottingham (GB); Graham Butler, Chilwell Nottingham (GB); Michael J Leach, Awsworth Nottingham (GB)

(73) Assignee: Marconi UK International Property Ltd., Coventry (GB)

( * ) Notice: Subject to any disclaimer, the term of this patent is extended or adjusted under 35 U.S.C. 154(b) by 0 days.

(21) Appl. No.: 10/764,732

(22) Filed: Jan. 26, 2004

(65) Prior Publication Data

US 2004/0156642 A1 Aug. 12, 2004

Related U.S. Application Data

(62) Division of application No. 10/239,382, filed as application No. PCT/GB01/01309 on Mar. 23, 2001, now Pat. No. 6,747,778.

(30) Foreign Application Priority Data

Mar. 23, 2000 (GB) .............................. 0006938
Nov. 9, 2000 (GB) .............................. 0027390

(51) Int. Cl.$^7$ ............................ G02B 6/00; G02B 6/36; H04B 10/04
(52) U.S. Cl. ...................... 385/140; 398/189; 359/264; 385/147
(58) Field of Search .................. 398/189; 359/264; 385/10–16, 140, 147

(56) References Cited

U.S. PATENT DOCUMENTS

| 5,103,462 A | | 4/1992 | Elle et al. | |
|---|---|---|---|---|
| 5,191,374 A | * | 3/1993 | Hazama et al. | 355/43 |
| 5,325,459 A | * | 6/1994 | Schmidt | 385/140 |
| 5,604,759 A | * | 2/1997 | Miyaki et al. | 372/38.02 |
| 5,764,172 A | | 6/1998 | Rodal | |
| 6,151,438 A | * | 11/2000 | Espindola et al. | 385/140 |
| 6,404,970 B1 | * | 6/2002 | Gransden et al. | 385/140 |
| 6,606,447 B2 | * | 8/2003 | Brown et al. | 385/140 |
| 6,700,517 B1 | * | 3/2004 | Kellar | 341/137 |
| 6,747,778 B2 | * | 6/2004 | Brown et al. | 359/264 |
| 6,853,758 B2 | * | 2/2005 | Ridgway et al. | 385/2 |
| 2002/0136523 A1 | * | 9/2002 | Brown et al. | 385/140 |
| 2003/0012483 A1 | * | 1/2003 | Ticknor et al. | 385/16 |
| 2003/0161639 A1 | * | 8/2003 | Brown et al. | 398/189 |
| 2004/0008916 A1 | * | 1/2004 | Ridgway et al. | 385/2 |

FOREIGN PATENT DOCUMENTS

| EP | 0 553 887 A3 | 8/1993 |
|---|---|---|
| GB | 2 144 005 A | 2/1985 |
| GB | 2 329 721 A | 3/1999 |
| JP | 59077721 | 5/1984 |
| JP | 61251320 | 11/1986 |
| JP | 9-318486 | 12/1996 |

* cited by examiner

Primary Examiner—Akm Enayet Ullah
(74) Attorney, Agent, or Firm—Kirschstein, et al.

(57) ABSTRACT

A method of generating a pulse width modulated (PWM) signal receives digital demand data comprising at least one more significant bit and at least one less significant bit. The PWM signal comprises a sequence of one or more frames, each frame comprising a plurality of PWM pulses whose duty cycle is substantially governed by the at least one more significant bit. At least one of its PWM pulses is selected to have its duty cycle modified in response to the at least one less significant bit. Each of the at least one less significant bit uniquely mapping onto the at least one selected PWM pulse of the frame. An apparatus operable according to this method includes an optical attenuator whose optical attenuation is dependent upon its temperature and in which the temperature and, hence, the attenuation is controlled using the above PWM signal.

10 Claims, 6 Drawing Sheets

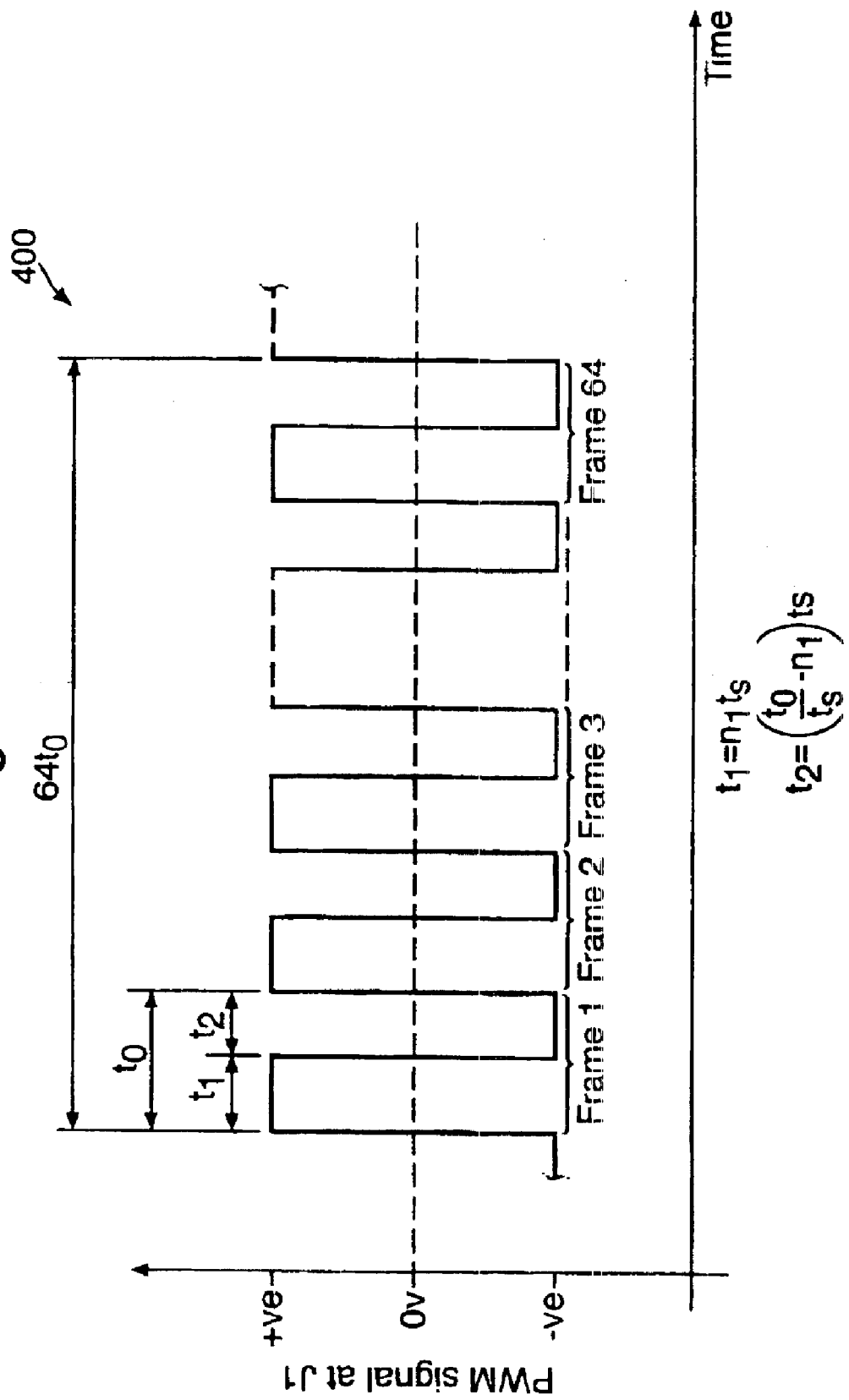

METHOD AND APPARATUS FOR GENERATING A PULSE WIDTH MODULATED SIGNAL AND OPTICAL ATTENUATOR CONTROLLED BY A PULSE WIDTH MODULATED SIGNAL

This application is a division of Ser. No. 10/239,382 filed Feb. 4, 2003 now U.S. Pat. No. 6,747,778, which is a 371 of PCT/GB01/01309 filed Mar. 23, 2001

The present invention concerns a method of, and apparatus for, generating pulse width modulation (PWM) signals. More especially the invention concerns controlling temperatures of electro-optical components such as attenuators, filters and solid state lasers. For use in optical communication. Moreover, although not exclusively, the invention concerns an optical attenuator with an enhanced resolution for use in an optical communication system.

It is conventional practice to employ optical attenuators in optical communication systems for regulating and controlling the power of optical radiation propagating within the systems. Such attenuation is necessary in order to avoid saturating sensitive optical components such as detectors and optical amplifiers, as well as ensuring that optical radiation is of sufficient power not to be swamped by noise. Saturation can lead to loss of information and hence errors in communication traffic conveyed by the systems.

Conventional optical attenuators employ a number of different optical component configurations, for example they can comprise one or more of Mach-Zehnder interferometers, modulated liquid crystal shutters and dispersion effect modulators. In communication systems, it is particularly convenient to employ thermally variable optical attenuators whose optical attenuation is determined by attenuator temperature. Thus, attenuation can be selected in these thermally variable attenuators by adjusting their temperature.

Temperature adjustment is conveniently achieved by including thermoelectric elements into the variable attenuators. Such elements function by the Seebeck effect and can selectively cool or heat attenuation determining optical components incorporated within the attenuators. However, the elements often consume significant power in operation, for example 2.5 Watts corresponding to an electrical drive signal of 5 volts potential at 0.5 amps current.

Conventional optical communication systems are typically configured as a plurality of nodes interconnected by optical fibre waveguides through which communication traffic bearing optical radiation propagates from one node to another. The nodes often comprise a considerable array of optical and electrical signal processing equipment usually arranged into equipment racks, for example conventional 19-inch racks. The equipment typically incorporates numerous examples of the aforementioned thermally variable attenuator. On account of inclusion of such examples, thermal power dissipation from the attenuators can represent a considerable thermal load in the equipment racks requiring cooling facilities, for example fans for providing cooling airflow through the racks.

The inventors have appreciated that, whereas it is not feasible to reduce thermal dissipation within the attenuators because such dissipation is dictated by fundamental characteristics of their associated thermoelectric elements, it is beneficial to reduce power dissipation within electrical driver circuits which provide power to the attenuators. It is known practice when driving thermoelectric elements to regulate the drive current using a conventional circuit comprising linear non-switching components such as series regulating bipolar power transistors driven by conventional analogue operational amplifiers. Such a circuit suffers a drawback that power dissipation within the power transistors can approach power dissipation occurring within their associated thermoelectric element. In order to address this drawback, the inventors have devised a circuit for driving a thermoelectric element of a thermally variable optical attenuator wherein the circuit employs pulse width modulation (PWM) techniques for generating a drive signal for driving the thermoelectric element, the circuit exhibiting reduced power dissipation compared to the aforementioned conventional circuit. However, the inventors have found that such PWM techniques provide insufficient resolution of attenuator temperature control when the drive signal is synthesised digitally in a known manner. Such insufficient resolution gives rise to corresponding lack of resolution of optical attenuation which creates problems in associated communication systems.

As is known a conventional PWM signal comprises a stream of repetitive pulses, each pulse having a duration $t_p$ and separated from neighbouring pulses thereto by a null period of duration $t_n$. Thus, the pulses are repeated at a period of $t_p + t_n$ and an average value V of the PWM signal is given by Equation 1 (Eq. 1):

$$V = \frac{(A-B) \cdot t_p}{(t_n + t_p)} + B \quad \text{Eq. 1}$$

where
A=signal value during the pulses; and
B=signal value during the null period.

Moreover, the pulses have a repetition frequency $f_p$ determined by Equation 2 (Eq. 2):

$$f_p = \frac{1}{(t_n + t_p)} \quad \text{Eq. 2}$$

In contemporary pulse width modulator design, pulses are often generated by digital counter circuits operating at a clocking frequency $f_{clk}$ of a master clock. As a consequence of employing such digital circuits, the durations $t_p$ and $t_n$ can only be modified in discrete steps, the number of steps M being determinable from Equation 3 (Eq. 3):

$$M = \frac{f_{clk}}{f_p} \quad \text{Eq. 3}$$

In order to increase the number of steps M, either $f_{clk}$ must be increased or a lower pulse repetition frequency $f_p$ must be accepted. In some applications, temporal variations in the value V can cause problems and thereby sets a lower limit on $f_p$. A conventional approach when enhanced PWM resolution is desired is to use a higher master clock frequency $f_{clk}$; such an approach results in greater cost associated with the digital circuits and also greater operating power dissipation therein. Moreover, there are practical limits to the frequency at which digital circuits can be clocked.

The inventors have appreciated that the number of steps M can effectively be increased by grouping the pulses into frames of F pulses where one or more pulses of each frame are made to have one step greater time duration than other pulses in the frame. Such a pulse frame technique increases the number of resolution steps to a value MF and results in a total temporal fluctuation not exceeding one step. Moreover, the inventors have appreciated that there are particular approaches to selecting the one or more pulses to be made one step greater which result in a relatively low harmonic content in a PWM signal thereby generated. Reducing harmonic content is important where the PWM signal is used to control appreciable current, for example, within an optical communication system where it is important to suppress interference between electronic assemblies resulting from PWM current surges.

The present invention has arisen in an endeavour to provide an optical attenuator and associated control circuit which provide power efficiency attributable to PWM operation but a variable attenuation of sufficient resolution for use in optical communication systems.

According to a first aspect of the invention a method of generating a pulse width modulated (PWM) signal comprises: receiving digital demand data comprising at least one more significant bit and at least one less significant bit; and generating the PWM signal comprising a sequence of one or more frames, each frame: comprising a plurality of PWM pulses whose duty cycle is substantially governed by the at least one more significant bit; and having at least one of its PWM pulses selected to have its duty cycle modified in response to the at least one less significant bit, each of the at least one less significant bit uniquely mapping onto the at least one selected PWM pulse of the frame.

The method provides the advantage that it is capable of providing a PWM signal having a reduced harmonic content in comparison to conventional methods of generating PWM signals.

Preferable, the method generates the PWM pulses occurring within each frame at a substantially constant pulse repetition frequency. A substantially constant frequency provides the benefit that filtering means can be included for filtering the PWM signal to remove the relatively higher harmonic components of the PWM signal and that the response of such filtering means do not need to be modified in response to PWM signal duty cycle.

Conveniently, the demand data includes one or more data words, each word comprising Q less significant bits $bit_i$ where an index i is in a range of 0 to Q such that $bit_0$ is the least significant bit, and PWM pulses are selected in each frame at a pulse interval $S_p$ within the frame, the interval $S_p$ being defined by:

$$S_p = INT(2^{Q-i})$$

where INT corresponds to an integer function.

The pulse interval $S_p$ is capable of ensuring that selected pulses for each bit are uniformly distributed throughout each frame, thereby reducing harmonic content of the PWM signal.

Preferable, a first pulse $S_c$ in each frame selected to have its duty cycle modified in response to a less significant bit with index i being set is defined by:

$$S_c = \frac{1}{2} S_p$$

Selecting $S_c$ in such a manner ensures that selected pulses are uniformly distributed from frame to frame for a given bit set. Moreover, in the special case of $bit_0$, it is preferable that $bit_0$ has a first corresponding pulse selected in each frame to be $S_c = S_p$, Such a selection of pulses for $bit_0$ is capable of simplifying digital circuit design.

In one example embodiment of the invention, it is convenient that each data word comprises 8 more significant bits and 7 less significant bits.

According to a further aspect of the present invention, there is provided apparatus for generating the PWM signal according to the above method. Preferably the apparatus includes clock means for generating a clock signal for processing according to the method to generate a corresponding PWM signal.

Preferably, the apparatus further comprises switching means for supplying electrical current to a load in response to the PWM signal. Advantageously the switching means are coupled in a bridge configuration. The apparatus provides the benefit of being capable of presenting the load with a PWM signal including fewer harmonic components in comparison to conventional PWM apparatus.

Conveniently, it is desirable to incorporate filtering means for attenuating relatively higher harmonic components of the PWM signal from reaching the load. Such filtration results in the load experiencing less harmonic components which can temporally influence its operation. Preferably, the filtering means comprises passive components having an impedance which is substantially reactive such as for example at least one inductor and at least one capacitor. More preferably, for reasons of physical compactness and potentially lower cost, the at least one inductor is ferrite cored.

Preferably, the load comprises a thermoelectric element. Such thermo-electric elements are known to require relatively high currents to operate, pulsed switching of these currents being a source of interference in electronic systems. Thus, the apparatus according to the invention is especially appropriate for use in controlling power to such an element.

Preferably, the element is thermally coupled to one or more of an optical attenuator, a laser and an optical filter for controlling their temperature and thereby their optical characteristics. The apparatus is capable of providing less electrical interference to the operation of such an attenuator, a laser and a filter in comparison to conventional PWM controllers.

The present invention finds particular application for controlling temperatures and thereby attenuation of optical attenuators for use in an optical communication system. Thus according to a further aspect of the invention an optical attenuator for receiving input radiation and attenuating the input radiation to provide corresponding output radiation comprises: attenuating means for receiving the input radiation and attenuating the input radiation to provide the output radiation in response to a drive signal; said attenuating means being operable to provide an attenuation dependent upon its temperature; the attenuating means including temperature modifying means for modifying its temperature in response to the drive signal and controlling means for receiving a signal indicative of attenuation required and for generating the corresponding drive signal is characterised in that the drive signal is derived from a PWM signal in which each PWM signal cycle corresponds to a frame, a plurality of such successive forming a multiframe and the controlling means being operable to modify the duty ratio of one or more frames within each multiframe for providing enhanced resolution attenuation provided by the attenuator The invention provides the advantage that the attenuator is capable of providing an enhanced degree of attenuation resolution together with power efficiency benefits associated with using the PWM drive signals in accordance with the present invention.

Conveniently, the controlling means includes filtering means for filtering the PWM signal to generate the drive signal. Such filtration provides a benefit that PWM cycle fluctuations are not directly experienced by the attenuating means and therefore less likely to be transmitted onto the output radiation.

The PWM signal is preferably of substantially constant cycle period, and the filtering means is operable to attenuate PWM signal components at a frequency corresponding to the cycle period. Such filtration is effective at removing principal fluctuating harmonic signal components present in the PWM signal. Conveniently, the filter is a passive filter comprising inductors and capacitors; such inductors and capacitors have low energy losses associated therewith and hence provide energy efficient conversion of the PWM signal to generate the drive signal.

Advantageously, modifications to the duty ratio of frames within each multiframe are substantially uniformly distributed within the multiframe. Such uniform distribution assists to reduce the magnitude of relatively low frequency perturbations in the drive signal. The duty ratio of each frame is preferably incrementable in discrete steps, the modifications to the duty ratio of the frames corresponding to one such step difference.

Conveniently, each multiframe comprises in a range of 2 to 1000 frames. This range provides a compromise between enhanced resolution and lower frequency signal fluctuations present in the drive signal. Preferably, each multiframe comprises 64 frames as an optimal compromise.

Advantageously, the attenuator is capable of providing radiation power stabilisation of the output radiation by using a negative feedback loop. In order to provide such stabilisation, the attenuator further comprises: detecting means for receiving a portion of the output radiation and generating a corresponding detection signal; amplifying means within the controlling means for comparing the detection signal with a reference signal and for adjusting via the temperature modifying means the temperature of the attenuating means so that the output radiation has associated therewith a radiation power determined by the reference signal.

When implementing the attenuator in practice, it is desirable the controlling means is implemented as a field programmable gate array (FPGA). Use of the FPGA provides benefits of reconfigurability whilst employing relatively few electronic components. Preferably, the FPGA is clocked at a rate of at least 30 MHz.

The temperature modifying means requires appreciable current to operate when providing a relatively high degree of heating or cooling of the attenuating means. Thus, conveniently, the FPGA is operable to generate a PWM signal which is buffered by power MOSFETs for output to drive the attenuating means.

Embodiments of the invention will now be described, by way of example only, with reference to the following diagrams in which:

FIG. 6 is a diagram illustrating a multiframe structure of a PWM signal generated in the FPGA shown in FIGS. 4 and 5.

Figure 1:
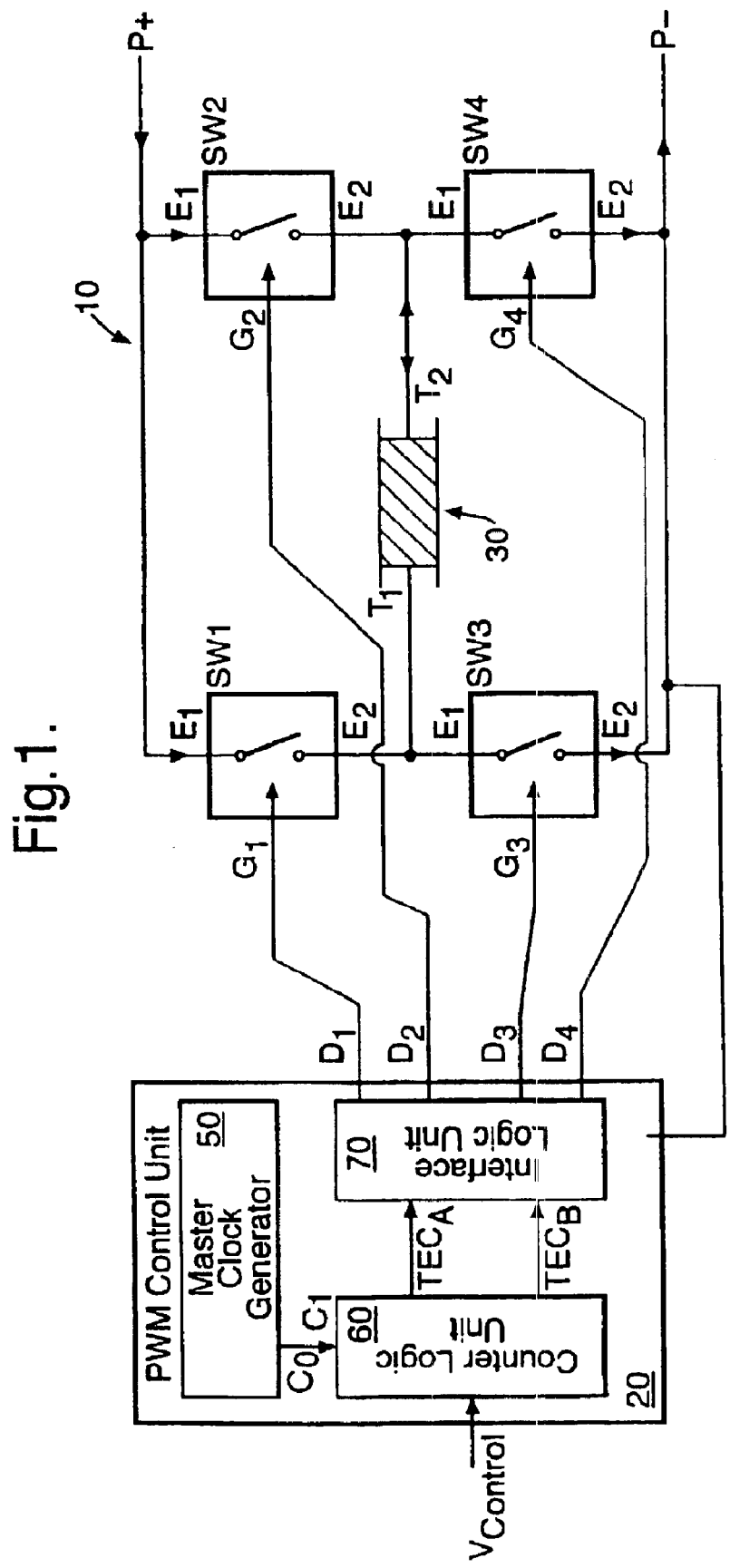
FIG. 1 is a schematic illustration of a PWM circuit according to the invention for controlling current into an electro-thermal element operating according to the Seebeck effect.

Referring to FIG. 1, there is shown a PWM circuit 10 for controlling current to a Seebeck effect electro-thermal element 30. As will be described the electrothermal element would typically be used to control the temperature and hence operation of an electro-optical component such as for example an attenuator, filter or solid state laser.

The circuit 10 and comprises a PWM control unit 20, and four MOSFET switches SW1, is SW2, SW3, SW4. The element 30 is commonly known as a "Peltier element". The control unit 20 includes a master clock generator 50, a counter logic unit 60 and an interface logic unit 70.

Interconnection of component parts of the circuit 10 will now be described, the interconnection as depicted in FIG. 1.

The switches SW1, SW2, SW3, SW4 each comprise a first electrode E1, a second electrode $E_2$ and an associated gate electrode G. A potential applied to the gate electrode G controls current flow from the first electrode $E_1$ to the second electrode $E_2$. The switches SW1 to SW4 are coupled together in a bridge configuration, the switches SW1, SW3 forming a first arm of the bridge and the switches SW2, SW4 forming a second arm of the bridge. The first electrodes $E_1$ of the switches SW1, SW2 are connected to a positive supply potential P+. Moreover, the second electrodes $E_2$ of the switches SW3, SW4 are connected to a negative supply potential P−. Furthermore, the second electrode E2 of the switch SW1 is coupled to the first electrode $E_1$ of the switch SW3 and also to a first terminal $T_1$ of the element 30. Likewise, the second electrode $E_2$ of the switch SW2 is coupled to the first electrode $E_1$ of the switch SW4 and also to a second terminal $T_2$ of the element 30. The gate electrodes $G_1$, $G_2$, $G_3$, $G_4$ of the switches SW1, SW2, SW3, SW4 respectively are connected to driver outputs $D_1$, $D_2$, $D_3$, $D_4$ respectively of the interface logic unit 70.

Within the PWM control unit 20, an output $C_o$ from the clock generator 50 is coupled to a clock input $C_1$ of the counter logic unit 60. The counter unit 60 also comprises an input for receiving a control input $V_{control}$. Moreover, the counter unit 60 includes outputs $TEC_A$ and $TEC_B$ which are connected to the interface unit 70.

Operation of the circuit 10 will now be described with reference to FIG. 1.

When current flows in a direction from the first terminal $T_1$ to the second terminal $T_2$, the element 30 provides cooling of an electro-optical component (not shown) thermally coupled to the element 30. Conversely, the element 30 provides heating of the component when current flows in a reverse direction from the second terminal $T_2$ to the first terminal T1. Thus, cooling is provided by the element 30 when the switches SW1, SW4 are simultaneously in a conducting state, and the switches SW2, SW3 are in a non-conducting state. Moreover, heating is provided by the element 30 when the switches SW2, SW3 are in a conducting state and the switches SW1, SW4 are in a non-conducting state. Conduction through the switches SW1, SW2, SW3, SW4 is controlled by the logic state of the driver outputs $D_1$, $D_2$, $D_3$, $D_4$ respectively. When one or more of these outputs are in a logic high state (H), their corresponding switches are in a conducting state between their electrodes $E_1$, $E_2$. Likewise, when one or more of these outputs are in a logic low state (L), their corresponding switches are in a non-conducting state between their electrodes $E_1$, $E_2$. The driver outputs states are governed by logic states of the outputs $TEC_A$, $TEC_B$ as presented in Table 1:

TABLE 1

| Comment | TEC$_A$ | TEC$_B$ | D$_1$ | D$_2$ | D$_3$ | D$_4$ |
|---|---|---|---|---|---|---|
| OFF | logic state 0 | logic state 0 | L | L | L | L |
| Cooling | logic state 0 | logic state 1 | H | L | L | H |
| Heating | logic state 1 | logic state 0 | L | H | H | L |
| Forbidden | logic state 1 | logic state 1 | — | — | — | — |

The driver outputs TEC$_A$, TEC$_B$ provide PWM signals which periodically switch conduction states of the switches SW1 to SW4. These signals have associated therewith a duty cycle which is determined by V$_{control}$.

The clock generator 50 generates a continuous logic output clock signal at a frequency of 15.36 MHz. The clock signal is received at the counter unit 60 which divides it down through an 8-bit binary counter by a factor of 256 to generate the outputs TEC$_A$, TEC$_B$ at which have a pulse repetition frequency of substantially 60 kHz. Moreover, the counter unit 60 is configured to control pulses at the outputs TEC$_A$, TEC$_B$ in groups, also referred to as frames, of 128 consecutive pulses. The frames therefore repeat at a frequency of substantially 470 Hz. As will be elucidated later, a combination of the 8-bit counter and use of frames comprising 128 pulses effective provides the circuit 10 with a control resolution of 15 bits.

The counter unit 60 is configured so that TEC$_A$, TEC$_B$ are not simultaneously in a logic state 1. Indeed, when TEC$_A$ switches from a logic state 1 to a logic state 0, two cycles of the clock generator, namely substantially 130 ns, are allowed to occur before TEC$_B$ switches from a logic state 0 to a logic state 1. Likewise, when TEC$_A$ switches from a logic state 1 to a logic state 0, two cycles of the clock generator, namely substantially 120 ns, are allowed to occur before TEC$_A$ switches from a logic state 0 to a logic state 1. The two cycles are allowed for the switches or each arm to reach a non-conducting state so that the supply potentials P+, P− are not momentarily short-circuited as this can give rise to high frequency current surges and also result in increased momentary dissipation in the switches.

The signal V$_{control}$ provides digital data for determining the duty cycle of current applied to the element 30, the signal V$_{control}$ having a digital word structure as provided in Table 2:

TABLE 2

| Most significant portion | | | | | | | | Least significant portion | | | | | | |
|---|---|---|---|---|---|---|---|---|---|---|---|---|---|---|
| Bit$_{14}$ | bit$_{13}$ | bit$_{12}$ | bit$_{11}$ | bit$_{10}$ | bit$_9$ | bit$_8$ | bit$_7$ | bit$_6$ | bit$_5$ | bit$_4$ | bit$_3$ | bit$_2$ | bit$_1$ | bit$_0$ |

Bit$_{14}$ of the word is the most significant bit whereas bit$_0$ is the least significant bit. The word is used to control the circuit 10 to a resolution of 1 in substantially 32000.

Figure 2:
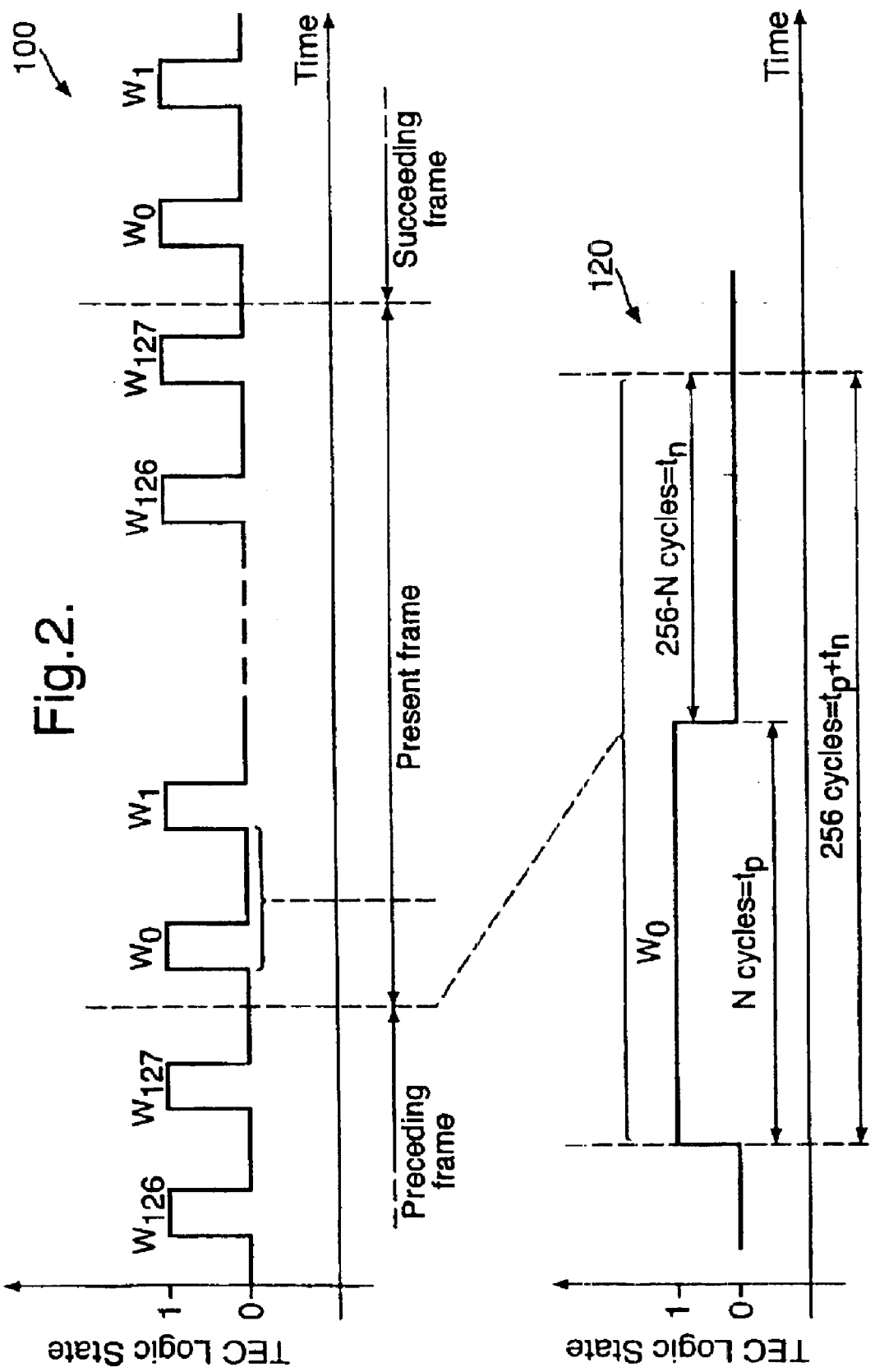
FIG. 2 is an illustration of a TEC temporal signal format in the circuit illustrated in FIG. 1.

The significance of the word structure in Table 2 will now be described with reference to FIG. 2. In FIG. 2, there is shown a temporal signal format for TEC$_A$ or TEC$_B$ in the circuit 10. The TEC$_A$ and TEC$_B$ outputs are, of course, subject to the aforementioned 2 clock cycle separation which will be disregarded for describing the word structure and its significance.

The counter unit 60 generates the TEC$_A$ or TEC$_B$ signal so that it comprises repetitive frames of 128 pulses as indicated by 100. Each pulse is configured as indicated by 120 and repeat at an interval of 256 clock cycles, 256 clock cycles corresponding to the durations t$_p$+t$_n$ in Equation 1.

Each pulse has a duration of N clock cycles corresponding to the duration t$_p$ and is separated from its preceding and successive neighbouring pulse by a null duration of 256-N clock cycles corresponding to the duration t$_n$ in Equation 1. Within the frame, one or more specific pulses have their associated N value incremented by 1 count to enhance resolution of the circuit 10. In the word in Table 2, bit$_7$ to bit$_{14}$ are processed in the counter unit 60 to control the value of N whereas bit$_0$ to bit$_6$ are processed to determine which of the pulses in each frame are to have their associated N value incremented by one count. When bit$_7$ to bit$_{14}$ are all logic 0, N has a value of 0; likewise, when bit$_7$ to bit$_{14}$ are all logic 1, N has a value of 255; likewise, when bit$_7$ to bit$_{13}$ are all logic 0 and bit$_{14}$ is logic 1, N has a value of 127, and so on.

Each of the bits bit$_0$ to bit$_6$ is mapped onto specific associated pulses W0 to W127 within the frame with regarding to incrementing N value of the specific pulses. Table 3 gives a full list of the association:

TABLE 3

| Bit | Associated one or more pulses within each frame to have its N value incremented |
|---|---|
| bit$_0$ | W127 |
| bit$_1$ | W31, W95 |
| bit$_2$ | W15, W47, W79, W111 |
| bit$_3$ | W7, W23, W39, W55, W71, W87, W103 |
| bit$_4$ | W3, W11, W19, W27, W35, W43, W51, W59, W67, W75, W83, W91, W99, W107, W115, W123 |
| bit$_5$ | W1, W5, W9, W13, W17, W21, W25, W29, W33, W37, W41, W45, W49, W53, W57, W61, W65, W69, W73, W77, W81, W85, W89, W93, W97, W101, W105, W109, W113, W117, W121, W125 |
| bit$_6$ | W0, W2, W4, W6, W8, W10, W12, W14, W16, W18, W20, W22, W24, W26, W28, W30, W32, W34, W36, W38, W40, W42, W44, W46, W48, W50, W52, W54, W56, W58, W60, W62, W64, W66, W68, W70, W72, W74, W76, W78, W80, W82, W84, W86, W88, W90, W92, W94, W96, W98, W100, W102, W104, W106, W108, W110, W112, W114, W116, W118, W120, W122, W124, W126 |

It is seen from Table 3 that each of the bits are arranged to map onto uniquely associated pulses within each frame.

The mapping is determined in a general case by Equations 4 and 5 (Eq. 4 and Eq. 5 respectively):

$$S_p = INT(2^{Q-i}) \qquad \text{Eq. 4}$$

for i=0, 1, 2, 3, . . .
where
S$_p$=pulse spacing within the frame;
Q=number of bits in the V$_{control}$ word accommodated by virtue of N incrementation within the frame;
i=bit index for which S$_p$ is to be calculated;
INT=integer rounding function.

$$C_p = \frac{1}{2} INT(2^{Q-i}) \qquad \text{Eq. 5}$$

for i=1, 2, 3, . . .
where $C_p$=starting pulse within the frame; and $C_p = INT(2^{Q-i})$ for i=0.

For example, when Q=6 and i=5, the spacing $S_p$ in Table 3 is 4, every fourth pulse in the frame is selected; Equation 4 returning a value 4. Likewise, when Q=6 and i=5, the starting pulse in Table 3 is W1, namely the second pulse where Equation 5 returns a value of 2; W0 is the first pulse.

It will be appreciated by one skilled in the art of PWM circuit design that the word structure in Table 2 is only an example and other lengths of word structure are possible, for example 12 bit instead of the 15 bits illustrated and described.

Information presented in Table 3 is provided in an alternative format in Table 4 to illustrate the pulses of each frame which are affected when certain bits in the word in Table 2 are set to logic state 1. When a pulse is affected, a "1" is included in a column associated with a particular bit in the word in Table 2:

TABLE 4

| Pulse | Bit6 | Bit5 | Bit4 | Bit3 | Bit2 | Bit1 | Bit0 |
|---|---|---|---|---|---|---|---|
| W0 | 1 | | | | | | |
| W1 | | 1 | | | | | |
| W2 | 1 | | | | | | |
| W3 | | | 1 | | | | |
| W4 | 1 | | | | | | |
| W5 | | 1 | | | | | |
| W6 | 1 | | | | | | |
| W7 | | | | 1 | | | |
| W8 | 1 | | | | | | |
| W9 | | 1 | | | | | |
| W10 | 1 | | | | | | |
| W11 | | | 1 | | | | |
| W12 | 1 | | | | | | |
| W13 | | 1 | | | | | |
| W14 | 1 | | | | | | |
| W15 | | | | | 1 | | |
| W16 | 1 | | | | | | |
| W17 | | 1 | | | | | |
| W18 | 1 | | | | | | |
| W19 | | | 1 | | | | |
| W20 | 1 | | | | | | |
| W21 | | 1 | | | | | |
| W22 | 1 | | | | | | |
| W23 | | | | 1 | | | |
| W24 | 1 | | | | | | |
| W25 | | 1 | | | | | |
| W26 | 1 | | | | | | |
| W27 | | | 1 | | | | |
| W28 | 1 | | | | | | |
| W29 | | 1 | | | | | |
| W30 | 1 | | | | | | |
| W31 | | | | | | 1 | |
| W32 | 1 | | | | | | |
| W33 | | 1 | | | | | |
| W34 | 1 | | | | | | |
| W35 | | | 1 | | | | |
| W36 | 1 | | | | | | |
| W37 | | 1 | | | | | |
| W38 | 1 | | | | | | |
| W39 | | | | 1 | | | |
| W40 | 1 | | | | | | |
| W41 | | 1 | | | | | |
| W42 | 1 | | | | | | |
| W43 | | | 1 | | | | |
| W44 | 1 | | | | | | |
| W45 | | 1 | | | | | |
| W46 | 1 | | | | | | |
| W47 | | | | | 1 | | |
| W48 | 1 | | | | | | |
| W49 | | 1 | | | | | |
| W50 | 1 | | | | | | |
| W51 | | | 1 | | | | |
| W52 | 1 | | | | | | |
| W53 | | 1 | | | | | |
| W54 | 1 | | | | | | |
| W55 | | | | 1 | | | |
| W56 | 1 | | | | | | |
| W57 | | 1 | | | | | |
| W58 | 1 | | | | | | |
| W59 | | | 1 | | | | |
| W60 | 1 | | | | | | |
| W61 | | 1 | | | | | |
| W62 | 1 | | | | | | |
| W63 | | | | | | | 1 |
| W64 | 1 | | | | | | |
| W65 | | 1 | | | | | |
| W66 | 1 | | | | | | |
| W67 | | | 1 | | | | |
| W68 | 1 | | | | | | |
| W69 | | 1 | | | | | |
| W70 | 1 | | | | | | |
| W71 | | | | 1 | | | |
| W72 | 1 | | | | | | |
| W73 | | 1 | | | | | |
| W74 | 1 | | | | | | |
| W75 | | | 1 | | | | |
| W76 | 1 | | | | | | |
| W77 | | 1 | | | | | |
| W78 | 1 | | | | | | |
| W79 | | | | | 1 | | |
| W80 | 1 | | | | | | |
| W81 | | 1 | | | | | |
| W82 | 1 | | | | | | |
| W83 | | | 1 | | | | |
| W84 | 1 | | | | | | |
| W85 | | 1 | | | | | |
| W86 | 1 | | | | | | |
| W87 | | | | 1 | | | |
| W88 | 1 | | | | | | |
| W89 | | 1 | | | | | |
| W90 | 1 | | | | | | |
| W91 | | | 1 | | | | |
| W92 | 1 | | | | | | |
| W93 | | 1 | | | | | |
| W94 | 1 | | | | | | |
| W95 | | | | | | 1 | |
| W96 | 1 | | | | | | |
| W97 | | 1 | | | | | |
| W98 | 1 | | | | | | |
| W99 | | | 1 | | | | |
| W100 | 1 | | | | | | |
| W101 | | 1 | | | | | |
| W102 | 1 | | | | | | |
| W103 | | | | 1 | | | |
| W104 | 1 | | | | | | |
| W105 | | 1 | | | | | |
| W106 | 1 | | | | | | |
| W107 | | | 1 | | | | |
| W108 | 1 | | | | | | |
| W109 | | 1 | | | | | |
| W110 | 1 | | | | | | |
| W111 | | | | | 1 | | |
| W112 | 1 | | | | | | |
| W113 | | 1 | | | | | |
| W114 | 1 | | | | | | |
| W115 | | | 1 | | | | |
| W116 | 1 | | | | | | |
| W117 | | 1 | | | | | |
| W118 | 1 | | | | | | |
| W119 | | | | 1 | | | |
| W120 | 1 | | | | | | |
| W121 | | 1 | | | | | |
| W122 | 1 | | | | | | |
| W123 | | | 1 | | | | |
| W124 | 1 | | | | | | |
| W125 | | 1 | | | | | |
| W126 | 1 | | | | | | |
| W127 | | | | | | | 1 |

It can be seen from Table 4 that only pulse W63 does not become modified as the word in Table 2 is altered in value. If necessary, bit0 can be arranged to modify pulse W63 instead of pulse W127 in which case Equation 5 is modified to Equation 6 (Eq. 6) to describe the starting pulse within the frame:

$$C_p = \frac{1}{2} INT(2^{Q-i})$$  Eq. 6 for i=0, 1, 2, 3, . . .

In order to illustrate benefits provided by the method of the invention, a comparison will now be made between a conventional PWM method and the method of the invention. For simplicity, a 12 bit word will be considered comprising 8 most significant bits and 4 least significant bits. The most significant bits 8 are used for controlling the duty cycle of each pulse and the least significant 4 bits are employed for controlling specific pulse incrementation within a 16 pulse frame. Thus $A_w$ corresponds to a pulse having a non-incremented corresponding N value as above, and $B_w$ corresponds to a pulse having a corresponding incremented N value.

In a first conventional approach for comparison, the incremented pulses are grouped together whereas in a second approach according to the invention, the incremented pulses are distributed as described above with reference to Tables 3 and 4 and Equations 4 and 5 but modified for a 12-bit word.

Thus, in the first approach, a frame temporal pulse sequence would be, for example, read left-to-right:
$A_w A_w A_w A_w A_w A_w A_w A_w B_w B_w B_w B_w B_w B_w B_w B_w$
namely the incremented pulses are grouped together.

However, in the second approach according to the invention, the frame temporal pulse sequence would be as read left-to right:
$A_w B_w A_w B_w A_w B_w A_w B_w A_w B_w A_w B_w A_w B_w A_w B_w$
namely the incremented pulses are distributed according to Equations 4 and 5.

A Fast Fourier Transform OFT) analysis has been performed by the inventors to determine harmonic content according resulting from the $A_w$, $B_w$ pulse sequences above corresponding to a value of 2056 in a total range value of 4096 corresponding to 12 bits, namely an average value 0.50195. Frequencies are normalised to frame harmonics. Moreover, harmonic 0 corresponds to an average value of 0.50171 which is close to the expected average of 0.50195, higher harmonics accounting for the discrepancy in these two value. Table 5 provides numerical results of the FFT analysis:

TABLE 5

| Normalised frequency | First approach | | Second approach according to the invention | |
| --- | --- | --- | --- | --- |
| | dB | Absolute value | dB | Absolute value |
| 0 | −5.990 | 0.50171 | −5.990 | 0.50171 |
| 1 | −57.89 | 0.00127 | −72.25 | 0.00024 |
| 2 | −72.25 | 0.00024 | −72.25 | 0.00024 |
| 3 | −65.97 | 0.00050 | −72.25 | 0.00024 |
| 4 | −72.25 | 0.00024 | −72.25 | 0.00024 |
| 5 | −68.36 | 0.00038 | −72.25 | 0.00024 |
| 6 | −72.25 | 0.00024 | −72.25 | 0.00024 |
| 7 | −69.15 | 0.00035 | −72.25 | 0.00024 |
| 8 | −72.25 | 0.00024 | −54.12 | 0.00197 |
| 9 | −69.15 | 0.00035 | −72.25 | 0.00024 |
| 10 | −72.25 | 0.00024 | −72.25 | 0.00024 |
| 11 | −68.36 | 0.00038 | −72.25 | 0.00024 |
| 12 | −72.25 | 0.00024 | −72.25 | 0.00024 |
| 13 | −65.97 | 0.00050 | −72.25 | 0.00024 |
| 14 | −72.25 | 0.00024 | −72.25 | 0.00024 |
| 15 | −57.89 | 0.00127 | −72.25 | 0.00024 |
| 16 | −9.940 | 0.31830 | −9.940 | 0.31830 |

It can be seen from Table 5 that the second approach results in a relatively lower harmonic content; for example the harmonic content at the first harmonic content is decreased by 14.36 dB on account of employing the second approach.

It is advantageous in the circuit 10 to include a passive filter, for example a combination of inductors and capacitors, in series with the element 30 to attenuate higher frequency harmonic components presented thereto. In the second approach, more of the harmonic energy in current provided by the circuit 10 to its element 30 is moved to relatively higher frequencies where it can more easily be attenuated by filtration. The passive filter beneficially includes ferrite-cored inductors and can be, for example, a π-network as illustrated in FIG. 3.

Figure 3:
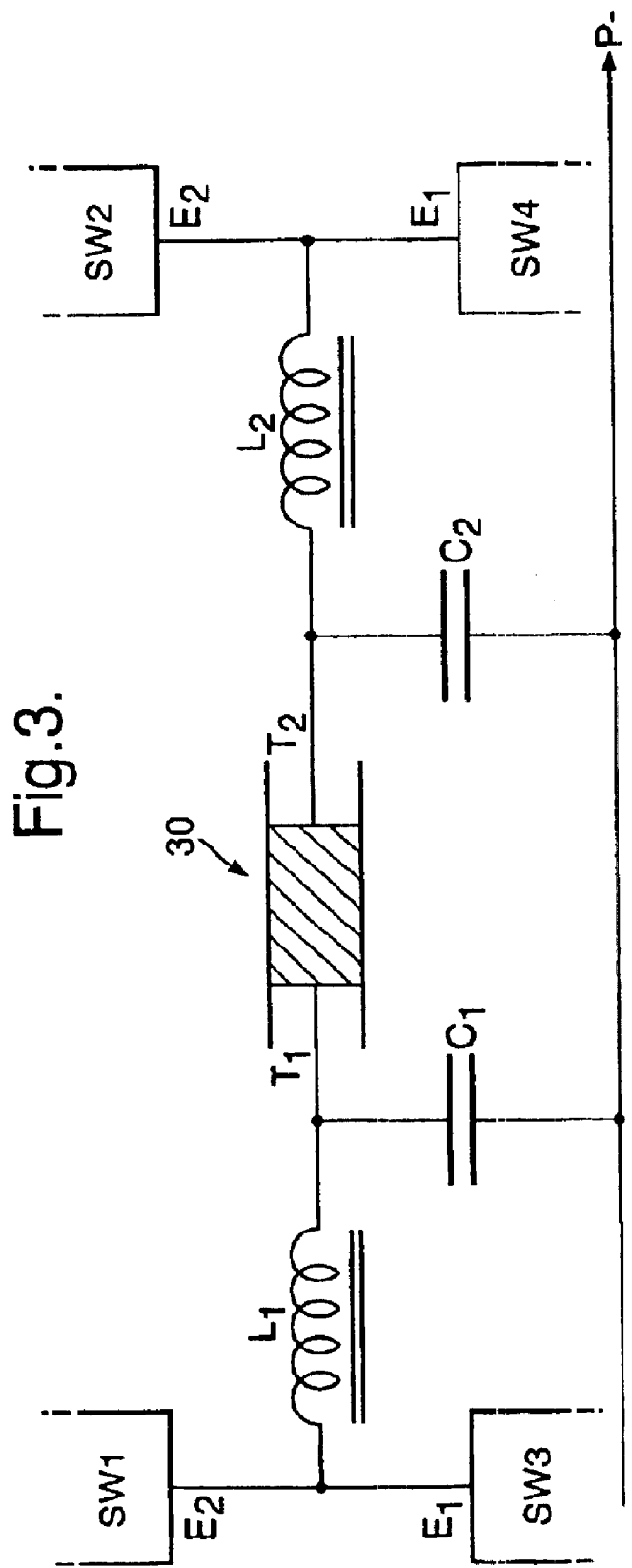
FIG. 3 is a π-network for including in the circuit in FIG. 1 for filtering harmonic content in current applied to the element.

In FIG. 3, the terminals $T_1$, $T_2$ are connected to the negative potential P− via capacitors $C_1$, $C_2$ respectively. The terminals $T_1$, $T_2$ are also connected via open-cored ferrite-cored inductors $L_1$, $L_2$ respectively to the first and second arms of the bridge respectively. The n-network is designed to attenuate current components having a frequency of 60 kHz or greater supplied to the element 30 so that the element 30 is substantially not exposed to these components. The network is also capable of attenuating to an extent at sub-harmonics of 60 kHz, for example below 1 kHz.

Figure 4:
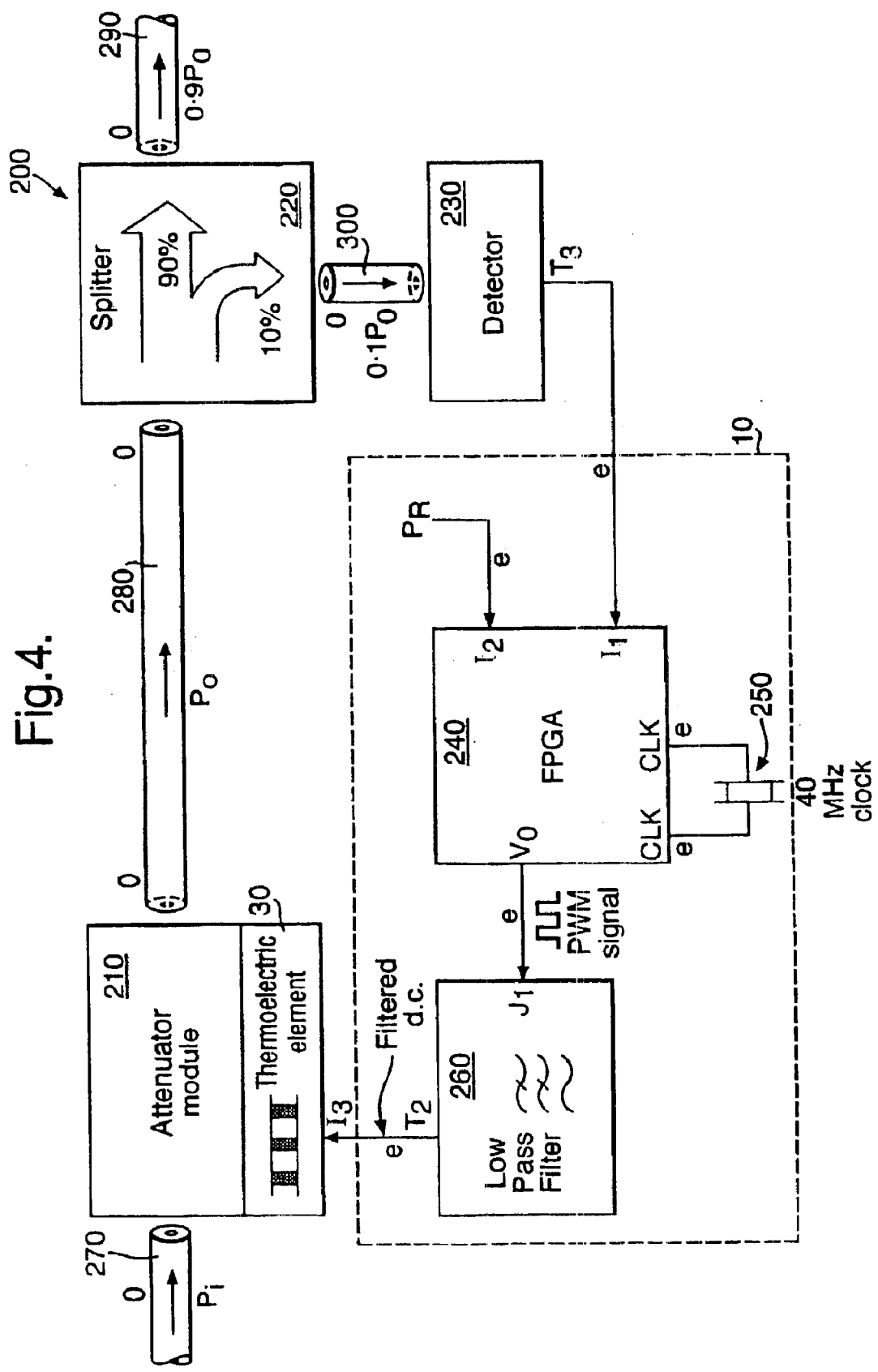
FIG. 4 is a schematic illustration of an enhanced resolution attenuator according to the invention which incorporates a PWM circuit in accordance with the invention.

Referring now to FIG. 4, there is shown an enhanced resolution optical attenuator according to the invention indicated generally by 200. For clarity the same reference numerals are used to denote like parts. The attenuator 200 includes an attenuator module 210 thermally coupled to an associated thermoelectric element 30, an optical splitter 220, an optical detector 230 and PWM control circuit 10 for controlling operation of the attenuator module 210. The PWM control circuit 10 comprises a field programmable gate array (FPGA) 240 connected to an associated timing clock 250, and an output low-pass filter 260. The attenuator 200 further comprises a first waveguide 270 connected to an optical input port of the attenuator module 210 for conveying input optical radiation $P_i$ thereto, a second waveguide 280 connected from an optical output port of the attenuator module 210 to an optical input port of the splitter 220, a third waveguide 290 connected to a first optical output port of the splitter 220, and fourth waveguide 300 connected from a second optical output port of the splitter 220 to an optical input port of the detector 230. The waveguides 270, 280, 290, 300 are each monomode optical fibre waveguides; they can alternatively be multimode waveguides. An electrical output $T_3$ of the detector 230 is connected to a first electrical input $I_1$ of the FPGA 240. The FPGA 240 also includes a second electrical input $I_2$ for receiving a reference input $P_R$ which determines an attenuation factor provided through the attenuator module 210. The FPGA 240 further includes an electrical output $V_o$ at which the PWM signal is output in operation; the output $V_o$ is connected to an electrical input $J_1$ of the low pass filter 260. An electrical output $J_2$ of the filter 260 is connected to an electrical input $I_3$ of the thermoelectric element 30. Finally, the clock 250 includes electrical outputs which are connected to clock (CLK) inputs of the FPGA 240.

The attenuator module 210 incorporates optical components which give rise to attenuation of the input radiation $P_i$ propagating through the module 210 from its input port to its output port. The optical components are operable to provide a degree of attenuation which is a function of their temperature. The thermoelectric element 30 is thermally coupled to these components and operable to influence their temperature by heating or cooling them relative to ambient temperature. The thermoelectric element 30 exploits the Seebeck effect to achieve such heating or cooling.

The splitter 220 is an optical fibre coupler which is operable to couple substantially in a ratio 90% and 10% of optical radiation $P_o$ received at its optical input port to its first and second optical output ports respectively; in practice, the ratio can be in a range 98%:2% to 85%:15%. The detector 230 includes a photodiode and is operable to receive optical radiation $0.1P_o$ at its optical input port and generate a corresponding electrical signal at the output $T_3$.

The low pass filter 260 is a passive filter network comprising inductors and associated capacitors. The filter 260 is operable to attenuate signal components in the PWM signal output from the output $V_O$ above 10 kHz and especially around 40 kHz. Thus, the filter 260 is capable of converting the PWM signal into a corresponding low-frequency direct current signal for driving the thermoelectric element 30.

The FPGA 240 is a semiconductor logic device incorporating an array of logic gates which are user configurable to customise the device to particular applications. In the attenuator 200, the FPGA 240 is configured to be clocked by the clock 250 at a rate of 40 MHZ. The FPGA 240 also provides an amplification function and also a PWM signal generating function.

The amplification function is used in the attenuator 200 to provide a negative feedback loop for adjusting attenuation provided by the attenuator module 210 so that the signal $T_3$ generated by the detector 230 is similar in value to the reference signal $P_R$. The amplification function is configured within the FPGA 240 to drive the PWM function which in turn generates the PWM signal for controlling power applied to the thermoelectric element 30.

The PWM signal function is operable to generate the PWM signal for output at the $V_o$ output, the signal being in the form of a binary signal periodically switching between a high state and a low state in a cyclical fashion. The signal has a period of 25 sec which corresponds to 40 kHz or, in other words, 1000 clock cycles of the clock 70. A frequency of 40 kHz for the PWM signal is chosen as a compromise between:

(a) choosing a frequency which enables practical values of inductors and capacitors to be used in the filter 260;
(b) choosing a frequency which is sufficiently high so that electrical ripple in the filtered output from the filter 260 does not become amplitude modulated onto optical radiation propagating through the attenuator module 210; and
(c) choosing a frequency which is sufficiently low for adequate adjustment resolution to be achieved when the PWM signal is generated digitally and derived from a master high frequency clock.

The operating frequency of the 40 MHz clock 250 is governed by the rate at which logic gates within the FPGA 240 can switch. Power applied to the thermoelectric element 30 is determined by the mark-space ratio of the PWM signal, in other words a ratio of the time for each cycle the PWM signal is in its first state relative to its second state. A mark-space ratio of 1:1 in the attenuator 200 corresponds to zero power being supplied to the thermoelectric element 30. Deviations from the ratio of 1:1 result in heating or cooling of the attenuator module 210.

As a consequence of there being 1000 clock cycles within each PWM cycle, the attenuator can provide cooling to a resolution of 500 steps and also heating to a resolution of 500 steps; this corresponds to 9-bit resolution for heating or cooling.

Operation of the attenuator 200 will now be described with reference to FIG. 4. The input radiation $P_i$ propagates along the first waveguide 270 to the attenuator module 210. The radiation $P_i$ propagates through the attenuator module 210 wherein it is attenuated to provide attenuated radiation $P_o$. The attenuated radiation $P_o$ propagates to the splitter 220 where substantially a 10% portion of the attenuated radiation $P_o$ couples through the waveguide 300 to the detector 230. The detector 230 receives the portion and generates the electrical signal $T_3$ which passes to the $I_1$ input of the FPGA 240. The FPGA 240 converts the $T_3$ signal using an analogue-to-digital converter (ADC) into corresponding $T_3$ data; it also converts the reference signal $P_R$ into corresponding $P_R$ data. The amplification function then calculates a difference between the $T_3$ data and the $P_R$ data to generate corresponding difference data. The difference data is passed from the amplification function to the PWM function which generates the PWM signal with a mark-space ratio (duty ratio) governed by the difference data. The PWM signal is then output from the FPGA 240 through MOSFET buffer power transistors (not shown in FIG. 4) and therefrom through the filter 260 to the thermoelectric element 30. The FPGA 240 is effective in operation to regulate the radiation power of the attenuated radiation $P_o$ to a level related to the reference signal $P_R$. If the reference signal $P_R$ is maintained substantially constant, the attenuator 200 will attempt to regulate the attenuated radiation $P_o$ to a substantially constant power level within an attenuation adjustment range and resolution provided by the attenuator module 210.

Figure 5:
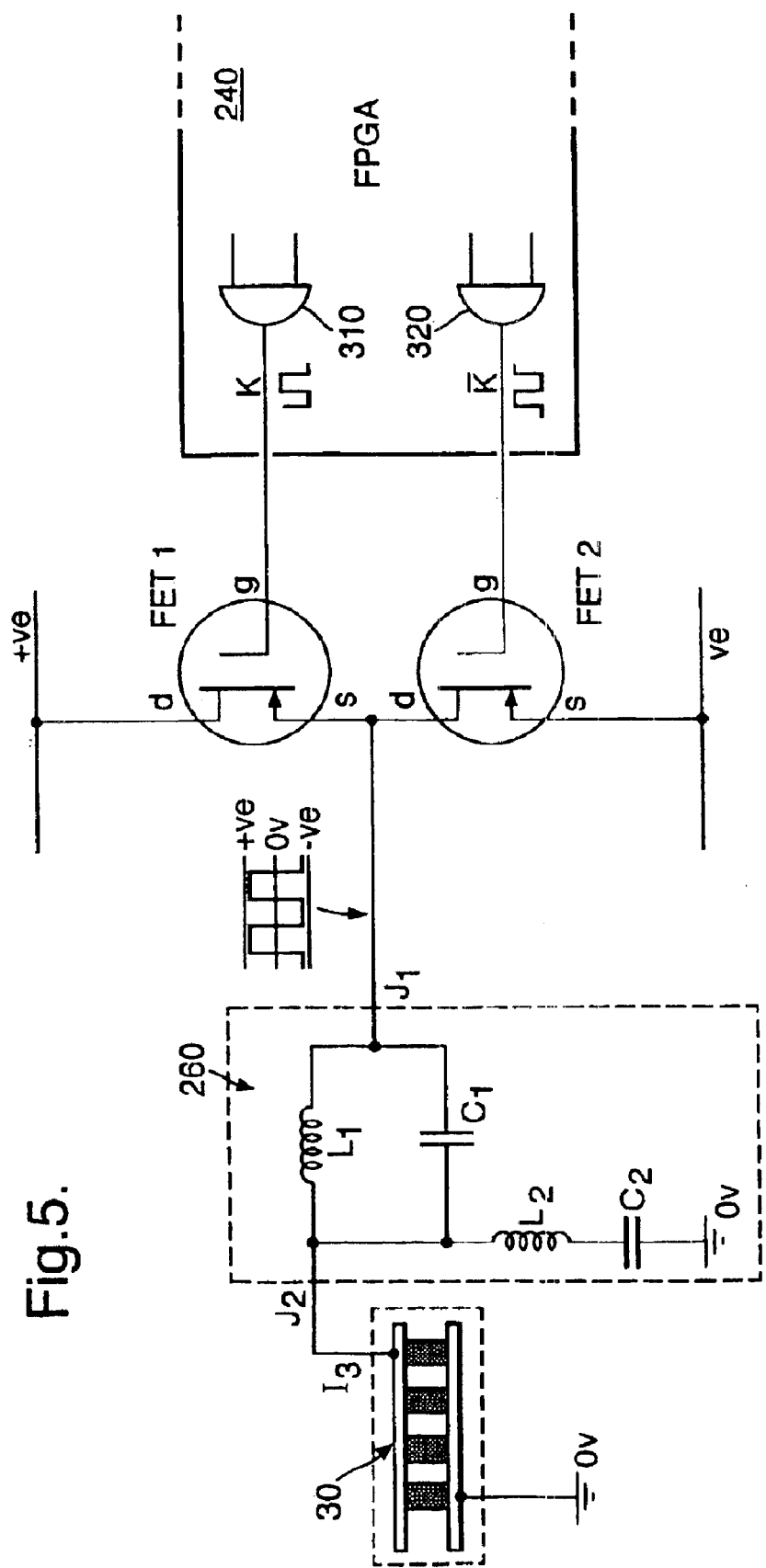
FIG. 5 is a diagram of a PWM output stage of an FPGA and low pass filter of the attenuator illustrated in FIG. 4.

The aforementioned MOSFET transistors and filter 260 will now be described in more detail with reference to FIG. 5. The FPGA 240 includes two output logic gates 310, 320 whose mutually antiphase outputs (K) switch between a positive supply rail (+ve) and a negative supply rail (−ve). An output from the gate 310 is connected to a gate electrode of a first power MOSFET (FETE). Likewise, an output from the gate 320 is connected to a gate electrode of a second power MOSFET (FET2). A drain electrode of the first MOSFET is connected to the positive rail +ve. Moreover, a source electrode of the second MOSFET is connected to the negative rail −ve. Source and drain electrodes of the first and second MOSFETs respectively are connected together and to the input $J_1$ of the filter 260.

The filter 260 includes an inductor $L_1$ connected in parallel with an associated capacitor $C_1$. Moreover, the filter 260 also includes an inductor $L_2$ connected in series with an associated capacitor $C_2$. The input $J_1$ is connected to a first node of a parallel resonant circuit comprising the inductor $L_1$ and the capacitor $C_1$. A second node of the parallel circuit is connected to a first terminal of the inductor $L_2$. A second terminal of the inducted $L_2$ is connected through the capacitor $C_2$ to a ground potential (0v). The rails (+ve, −ve) are symmetrically disposed in potential relative to the ground potential (0v). Additionally, the parallel and series resonant circuits are designed to resonate at 40 kHz so that components in the PWM signal at 40 kHz applied to the $J_1$ input are substantially not transmitted through the filter 260 so that the electrical signal applied to the input $I_3$ of the thermoelectric element 30 is substantially low frequency "direct current", namely substantially devoid of alternating components.

In operation, when the mark-space ratio of the PWM signal is 1:1, the signal applied to the $J_1$ input is connected through the first MOSFES (FET1) to the positive rail (+ve) for a period equal to a period when the $J_1$ input is connected through the second MOSFET (FET2) to the negative rail (−ve). Such a 1:1 mark-space ratio results in an average potential around 0v being supplied to the thermoelectric element 30, namely substantially zero current through the element 30. As the mark-space ratio (duty ratio) is varied away from 1:1, current flow will occur through the element 30 in both positive and negative directions giving rise to corresponding heating or cooling of the attenuator module 210 respectively. For example, if the output K is mostly at a potential of the positive rail, the first MOSFET (FET1) will be conducting most of the time, thereby providing a positive current flowing through the filter 260 and into the input $I_3$ of the element 30 to 0v and thus causing heating of the module 210. Conversely, if the output K is mostly at a potential of the negative rail, the second MOSFET (FET2) will be conducting most of the time, thereby providing a negative current flowing through the filter 260 and into the input 13 of the element 30 to 0v and thus causing cooling of the module 210.

As described above, a problem arises with the attenuator 210 regarding resolution. The PWM frequency of 40 kHz is selected as a compromise and provides 500 steps of resolution for positive currents through the element 30 and also 500 steps of resolution for negative currents through the element 30. It is found in practice that such 500 steps of resolution corresponding to 9-bits resolution is often too coarse when using the attenuator 20 to regulate the attenuated radiation to a precision required in communication systems; such coarseness is a problem. Ideally, 16-bits resolution is desired but would require the FPGA 240 to clock at a frequency of 2.5 GHz which is unrealistic. One solution to the problem would be to select a lower PWM frequency; to obtain 16-bit resolution, the PWM signal frequency would have to be reduced to 620 Hz which is impractical with regard to component values for the filter 260. Another solution would be to dispense with PWM operation and employ linear regulation; such linear regulation is, however, not practical on aforementioned grounds of power dissipation.

The inventors have addressed the problem using the multiframe approach to generate the PWM signal within the FGPA 240 as described above. This multiframe approach will now be described further with reference to FIG. 6.

In FIG. 6, there is shown the multiframe structure of the PWM signal indicated generally by 40. Each cycle of the PWM signal generated by the FPGA 240 has a duration of $t_0 = 25$ μsec and is referred to as a frame. Sixty four such frames form a multiframe having a duration of 64 $t_0$. Each frame is in a high state (+ve) for a period $t_1$, and in a low state (−ve) for a period $t_2$. The periods to and $t_2$ sum $t_1$ the period $t_0$. The FPGA 240 clocks at a rate of 40 MHZ enabling the periods $t_1$ and $t_2$ to be generated with a resolution of 25 nsec time steps $t_s$. Thus, the period $t_1$ can be expressed by Equation 1 (Eq. 1):

$$t_1 = n_1 t_s \qquad \text{Eq 7}$$

where $n_1$ = number of time steps $t_s$ in the period $t_1$.

Moreover, the period $t_2$ can be expressed by Equation 8 (Eq. 8):

$$t_2 = \left(\frac{t_0}{t_s} - n_1\right) t_s \qquad \text{Eq. 8}$$

The number of time steps $n_1$ are modifiable by the FPGA 240 to be in a range of 1 to 1000; as described above, 1000 steps are inadequate resolution in the context of optical attenuation in a communication system. The inventors have appreciated that, although it is not possible to increase the resolution within each frame, it is feasible to enhance resolution by modifying the duration of one or more frames within each multiframe. By keeping the modification to one time step $t_s$, the modification represents a small perturbation which is not apparent in attenuated radiation $P_o$ output from the attenuator module 210.

For example, a slight increase in thermoelectric element drive current is desired from a situation where $n_1 = 500$ for all the 64 frames of the multiframe. Using the multiframe approach, $n_1$ for frames 1 to 63 can be set to a value 500, and $n_1$ for frame 64 to a value 501. The approach thereby provides an average $n_1$ for each frame of the multiframe of 500.015625. Thus, use of the 64 frame multiframe increases resolution by 6 bits which, combined with 10 bits resolution (1000 counts) provided within each frame, provides an overall effective resolution of 16 bits which is adequate in the context of the attenuator 10 operating in a communication system.

An issue arises when a plurality of frames within the multiframe are to be incremented each by one count, the issue concerning which frames of the multiframe to increment. When two frames are each to be incremented by 1 count, it is preferable that frames 32 and 64 are incremented, thereby distributing associated perturbations as uniformly as possible within the multiframe; this assists to prevent transient thermal fluctuations within the thermoelectric element 30 being detectable as modulation in the attenuated radiation $P_o$. Such fluctuations could arise if the frames chosen for incrementation were grouped together in one region of the multiframe. Likewise, when three frames are each to be incremented by one count, it is preferable that frames 21, 43, 64 are incremented, and so on. Table 6 provides a list of frames to be incremented when control to a resolution greater than the step $t_s$ is required.

It can be seen from Table 6 that frames within the multiframe requiring incrementation to obtain resolution of fractions of the time step tS are distributed as uniformly as possible within the multiframe.

TABLE 6

| No. of frames each to have its $n_1$ value incremented by 1 count | Specific frames within the multiframe to be incremented |
|---|---|
| 1 | 64 |
| 2 | 32, 64 |
| 3 | 21, 43, 64 |
| 4 | 16, 32, 48, 64 |
| 5 | 13, 26, 38, 51, 64 |

TABLE 6-continued

| No. of frames each to have its $n_1$ value incremented by 1 count | Specific frames within the multiframe to be incremented |
|---|---|
| 6 | 11, 21, 32, 43, 53, 64 |
| 7 | 9, 18, 27, 37, 48, 55, 64 |
| 8 | 8, 16, 24, 32, 40, 48, 56, 64 |
| 9 | 7, 14, 21, 28, 36, 43, 50, 59, 64 |
| 10 | 6, 13, 19, 26, 32, 38, 45, 51, 58, 64 |
| 11 | 5, 12, 17, 23, 29, 35, 41, 47, 52, 58, 64 |
| 12 | 5, 11, 16, 21, 27, 32, 37, 43, 48, 53, 59, 64 |
| 13 | 5, 10, 15, 20, 25, 30, 34, 39, 44, 49, 54, 59, 64 |
| 14 | 5, 9, 14, 18, 23, 27, 32, 37, 41, 46, 50, 55, 59, 64 |
| 15 | 4, 9, 13, 17, 21, 26, 30, 34, 38, 43, 50, 51, 55, 60, 64 |
| 16 | 4, 8, 12, 16, 20, 24, 28, 32, 36, 40, 44, 48, 52, 56, 60, 64 |
| 17 | 4, 8, 11, 15, 19, 23, 26, 30, 34, 38, 41, 45, 49, 53, 56, 60, 64 |
| 18 | 4, 7, 11, 14, 18, 21, 25, 28, 32, 36, 39, 43, 46, 50, 53, 57, 60, 64 |
| 19 | 3, 7, 10, 13, 17, 20, 24, 27, 30, 37, 37, 40, 44, 47, 51, 54, 57, 61, 64 |
| 20 | 3, 6, 10, 13, 16, 19, 22, 26, 29, 32, 35, 38, 42, 45, 48, 51, 54, 58, 61, 64 |
| 21 | 3, 6, 9, 12, 15, 18, 21, 24, 27, 30, 34, 37, 40, 43, 46, 49, 52, 55, 58, 61, 64 |
| 22 | 3, 6, 9, 12, 15, 17, 20, 23, 26, 29, 32, 35, 38, 41, 44, 47, 49, 52, 55, 58, 61, 64 |
| 23 | 3, 6, 8, 11, 14, 17, 19, 22, 25, 28, 31, 33, 36, 39, 42, 45, 47, 50, 53, 56, 58, 61, 64 |
| 24 | 3, 5, 8, 11, 13, 16, 19, 21, 24, 27, 29, 32, 35, 37, 40, 43, 45, 48, 51, 53, 56, 59, 61, 64 |
| 25 | 3, 5, 8, 10, 13, 15, 18, 20, 23, 26, 28, 31, 33, 36, 38, 41, 44, 46, 49, 51, 54, 56, 59, 61, 64 |
| 26 | 2, 5, 7, 10, 12, 15, 17, 20, 22, 25, 27, 30, 32, 34, 37, 39, 42, 44, 47, 49, 52, 54, 57, 59, 62, 64 |
| and so on equally distributed to | |
| 58 | 1, 2, 3, 4, 6, 7, 8, 9, 10, 11, 12, 13, 14, 15, 17, 18, 19, 20, 21, 22, 23, 24, 25, 26, 28, 29, 30, 31, 32, 33, 34, 35, 36, 38, 39, 40, 41, 42, 43, 44, 45, 46, 47, 49, 50, 51, 52, 54, 55, 56, 57, 58, 59, 60, 61, 62, 63, 64 |
| 59 | 1, 2, 3, 4, 5, 7, 8, 9, 10, 11, 12, 13, 14, 15, 16, 17, 18, 20, 21, 22, 23, 24, 25, 26, 27, 28, 29, 30, 31, 33, 34, 35, 36, 37, 38, 39, 40, 41, 42, 43, 44, 46, 47, 48, 49, 50, 51, 52, 53, 54, 55, 56, 57, 59, 60, 61, 62, 63, 64 |
| 60 | 1, 2, 3, 4, 5, 6, 7, 9, 10, 11, 12, 13, 14, 15, 16, 17, 18, 19, 20, 21, 22, 23, 25, 26, 27, 28, 29, 30, 31, 32, 33, 34, 35, 36, 37, 38, 39, 41, 42, 43, 44, 45, 46, 47, 48, 49, 50, 51, 52, 53, 54, 55, 57, 58, 59, 60, 61, 62, 63, 64 |
| 61 | 1, 2, 3, 4, 5, 6, 7, 8, 9, 10, 11, 13, 14, 15, 16, 17, 18, 19, 20, 21, 22, 23, 24, 25, 26, 27, 28, 29, 30, 31, 33, 34, 35, 36, 37, 38, 39, 40, 41, 42, 43, 44, 45, 46, 47, 48, 49, 50, 51, 52, 54, 55, 56, 57, 58, 59, 60, 61, 62, 63, 64 |
| 62 | 1, 2, 3, 4, 5, 6, 7, 8, 9, 10, 11, 12, 13, 14, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 49, 50, 51, 52, 53, 54, 55, 56, 57, 58, 59, 60, 61, 62, 63, 64 |
| 63 | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64 |
| 64 | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64 |

The multiframe approach provides a superior result compared to using a lower frame frequency to obtain for resolution because only small perturbations of one count occur within the multiframe; this represents only a relatively small temporal power deviation compared to a PWM signal not using the multiframe approach and of a frequency lower in proportional by the number of frames in the multiframe. Thus, the attenuator 200 devised by the inventors provides not only enhanced resolution but also power efficiency associated with PWM control and the FPGA 240 operating at a convenient frequency of 40 MHz.

It will be appreciated that modifications can be made to the attenuator 200 and/or PWM circuit without departing from the scope of the invention. Although FIG. 4 illustrates the FPGA 240 providing a local feedback loop to stabilise radiation power of the attenuated radiation $P_o$, it is possible for the FPGA 240 to receive control signals from other circuits, for example detector circuits further downstream from the attenuator 200 in the communication system, but control the thermoelectric element using the aforementioned multiframe technique applied in the PWM drive signal. Moreover, although a multiframe comprising 64 frames is described above, the multiframe can be modified to include a different number of frames, for example in the range of 2 to 1000 frames depending upon resolution requirements. Furthermore, although the FPGA 240 is described as being clocked at 40 MHZ, it can be clocked at rates of at least 30 MHz provided that the filter 260 is suitably tuned in accordance.

Furthermore although the PWM circuit is described in relation to the control of components suitable for use within optical communications systems, the apparatus and/or method is also applicable to other applications in which PWM current control occurs, for example in electrical motor systems, in mechanical servo systems, in robotic systems and so on.

What is claimed is:

1. An optical attenuator for receiving input radiation and attenuating the input radiation in response to a drive signal to provide corresponding output radiation, and for providing an attenuation dependent upon its temperature, the attenuator comprising: temperature modifying means for modifying its temperature in response to the drive signal; and controlling means for receiving a signal indicative of attenuation required, and for generating the corresponding drive signal which comprises a pulse width modulated (PWM) signal, each PWM signal cycle corresponding to a frame, a plurality of successive frames forming a multiframe, the controlling means being operable to modify a duty ratio of at least one of the frames within each multiframe for providing enhanced resolution attenuation provided by the attenuator.

2. The attenuator according to claim 1, in which the PWM signal is of substantially constant cycle period, and further comprising filtering means operable to attenuate components of the PWM signal at a frequency corresponding to the cycle period.

3. The attenuator according to claim 1, in which modifications to the duty ratio of the frames within each multiframe are substantially uniformly distributed within the multiframe.

4. The attenuator according to claim 2, in which the duty ratio of each frame is incrementable in discrete steps, the modifications to the duty ratio of the frames corresponding to one such step difference.

5. The attenuator according to claim 1, in which each multiframe comprises in a range of from 2 to 1000 frames.

6. The attenuator according to claim 5, in which each multiframe comprises 64 frames.

7. The attenuator according to claim 1, and further comprising detecting means for receiving a portion of the output radiation, and for generating a corresponding detection signal; amplifying means within the controlling means for comparing the detection signal with a reference signal, and for adjusting via the temperature modifying means the temperature of the attenuator so that the output radiation has associated therewith a radiation power determined by the reference signal.

8. The attenuator according to claim 1, in which the controlling means is implemented as a field programmable gate array (FPGA).

9. The attenuator according to claim 8, in which the FPGA is operable to generate the PWM signal which is buffered by power MOSFETs for output to drive the attenuator.

10. The attenuator according to claim 8, in which the FPGA is clocked at a rate of at least 30 MHz.

* * * * *

UNITED STATES PATENT AND TRADEMARK OFFICE
CERTIFICATE OF CORRECTION

PATENT NO.       : 6,934,458 B2
APPLICATION NO.  : 10/764732
DATED            : August 23, 2005
INVENTOR(S)      : Brown et al.

It is certified that error appears in the above-identified patent and that said Letters Patent is hereby corrected as shown below:

In Column 6, Line 1, delete "electrothermal" and insert -- electro-thermal --, therefor.

In Column 6, Line 6, after "circuit 10" delete "and".

In Column 6, Line 7, after "SW1," delete "is".

In Column 6, Line 15, delete "E1," and insert -- $E_1$, --, therefor.

In Column 6, Line 26, delete "E2" and insert -- $E_2$ --, therefor.

In Column 6, Line 51, delete "T1." and insert -- $T_1$. --, therefor.

In Column 11, Line 41, delete "OFT)" and insert -- (FFT) --, therefor.

In Column 12, Line 33, delete "n-network" and insert -- $\pi$-network --, therefor.

In Column 13, Line 35, delete "MHZ." and insert -- MHz. --, therefor.

In Column 13, Line 50, delete "sec" and insert -- $\mu$sec --, therefor.

In Column 14, Line 47, delete "(FETE)." and insert -- (FET1). --, therefor.

In Column 15, Line 8, delete "MOSFES" and insert -- MOSFET --, therefor.

In Column 15, Line 25, delete "13" and insert -- $I_3$ --, therefor.

In Column 16, Line 2, delete "MHZ" and insert -- MHz --, therefor.

In Column 16, Line 55, delete "tS" and insert -- $t_s$ --, therefor.

UNITED STATES PATENT AND TRADEMARK OFFICE
CERTIFICATE OF CORRECTION

PATENT NO. : 6,934,458 B2
APPLICATION NO. : 10/764732
DATED : August 23, 2005
INVENTOR(S) : Brown et al.

It is certified that error appears in the above-identified patent and that said Letters Patent is hereby corrected as shown below:

In Column 18, Line 51, delete "MHZ," and insert -- MHz, --, therefor.

Signed and Sealed this

Twenty-fourth Day of February, 2009

JOHN DOLL
*Acting Director of the United States Patent and Trademark Office*